July 12, 1960 — W. J. STEINMETZ — 2,944,707
DISPENSING DEVICE

Filed Aug. 5, 1957 — 2 Sheets-Sheet 1

INVENTOR.
WILLIAM J. STEINMETZ
BY Robert A. Spray

July 12, 1960 W. J. STEINMETZ 2,944,707
DISPENSING DEVICE
Filed Aug. 5, 1957 2 Sheets-Sheet 2

INVENTOR.
WILLIAM J. STEINMETZ
BY Robert A. Spray

United States Patent Office 2,944,707
Patented July 12, 1960

2,944,707

DISPENSING DEVICE

William J. Steinmetz, 3752 N. Ritter Ave.,
Indianapolis, Ind.

Filed Aug. 5, 1957, Ser. No. 676,126

9 Claims. (Cl. 222—254)

This invention relates to dispensing apparatus, and more particularly to apparatus adapted to dispense powdered material such as instant coffee and the like from an associated container. Other uses and purposes will appear to those skilled in the art, in the light of this description.

An object of the present invention is to provide dispensing means having a novel construction and arrangement, providing novel means for the dispensing of differing pre-selected amounts of the material.

A further object is to provide such novel dispensing means which provides a plurality of discharge valve means operatively inter-acting in a plurality of optionally selectable manners to provide that differing quantities of the material may be conveniently dispensed at the will of the operator.

A still further object is to provide novel dispensing means having a seriese of valve means manipulatable to dispense selectively according to one or to a plurality of said valve means by desired movement of a selected operating means.

A still further object of the present invention is to provide an easily operated dispensing means of new and useful construction, which will be economical of construction and assembly, and which will provide desired batch-type dispensing of material in a plurality of optionally selectable amounts by novel quantity-regulating means.

In carrying out my invention in a desired embodiment, I provide a supporting frame member adapted to be mounted adjacent the outlet of an associated container. Mounted as in a stacked series on the frame member are a plurality of valve plates, each of which are provided with an aperture or metering opening. The arrangement desirably is such that when the valve plates are in a non-dispensing position, the metering openings of all the valve plates are in communicating registry one with another and in communication with the associated container, with an end plate means preventing dispensing through the valve plates. The end plate means is provided with a discharge opening; and means are provided to move selectively one or more of the valve plates into discharge communication with that opening, and concurrently out of communication with the associated container. In a preferred embodiment, the moving means for the valve plates provide that the outermost plate is movable independently of the relatively inner plates, permitting it to be moved to dispense a quantity in accordance with the volume of its metering opening; the next plate is movable in accordance with the outermost plate, peremitting the dispensing of a quantity in accordance with the volume of the metering openings of the two plates; a further, relatively inner plate is also desirably provided, movable in accordance with the relatively outer plates to permit the dispensing of a quantity in accordance with the volume of the metering openings of the three plates.

These and other objects, features, and advantages of the present invention will further appear from the following description of an illustrative embodiment thereof, taken in conjunction with the accompanying drawings, in which.

Figure 1:
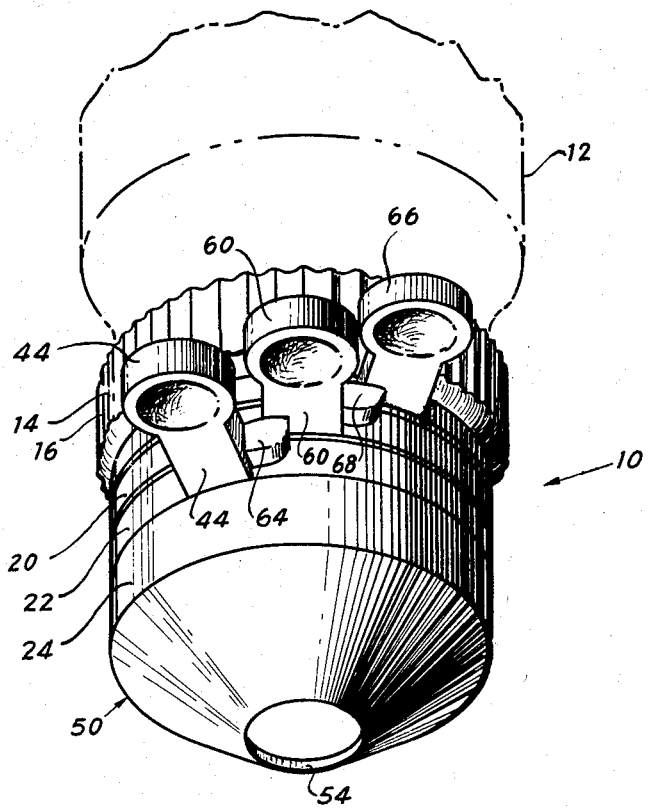
Fig. 1 is an isometric representation of a dispensing device according to the present invention, shown mounted on an associated container.

According to my invention as illustrated in the drawings, I provide new and useful dispensing means generally designated by reference numeral 10 adapted to be utilized with an associated container 12 for the dispensing material contained therein. In a desirable application, such material is powdered material commonly referred to as "instant coffee."

By the present invention, the dispensing means 10 provides for the selective dispensing of different amounts of the material; and as the present embodiment will be described in conjunction with the operation of dispensing instant coffee, the dispensing means here shown provides for the dispensing of amounts corresponding to "level teaspoon," "slightly-rounded spoon," and "full-rounded spoon" batches.

Accordingly, there is provided an attaching means such as the frame member 14 for attaching the dispensing means to the container 12. The frame member as shown comprises an annular flange 16 having screw threads 18 for securing the frame-member to the container 12.

A feature of this invention is the provision of a valve means such as a series of valve means such as discharge assistants or valve-plate members extending in a stacked series arrangement, with operating means providing for selected translation of one or more of the valve means, permitting discharge from one or more of such valve means according to the amount of material desired to be dispensed.

Accordingly, a relatively inner valve plate 20, an intermediate valve plate 22, and an outer valve plate 24 are shown as rotatably movably carried by means such as a spindle 26 shown as molded integral with frame-member 14 and extending longitudinally of the dispenser.

Figure 4:
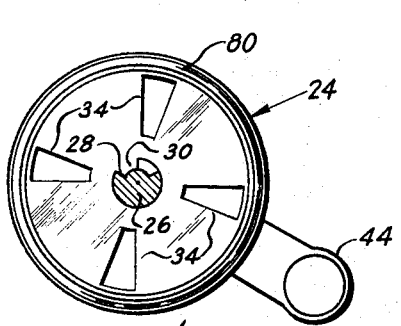
Figs. 4 and 5 are transverse cross-sectional views taken generally along the lines IV—IV and V—V of Fig. 3, in reduced scale.

As illustrated in Fig. 4, the spindle is shown provided with a slot or keyway 28 into which is received a tab 30 of valve-plate 24. The relative size of the keyway and tab is shown as permitting the relative rotation to permit the movement between dispensing and non-dispensing position of the valve plate, as now to be described, it being understood that similar tabs permit restricted relative rotation of valve plates 20 and 22.

The valve plate 24, which in all figures is shown in in non-dispensing position, is shown provided with an aperture arrangement of metering openings 34. The volume of the total of these openings 34 is that of a "level teaspoon" batch of the material to be dispensed.

Figure 3:
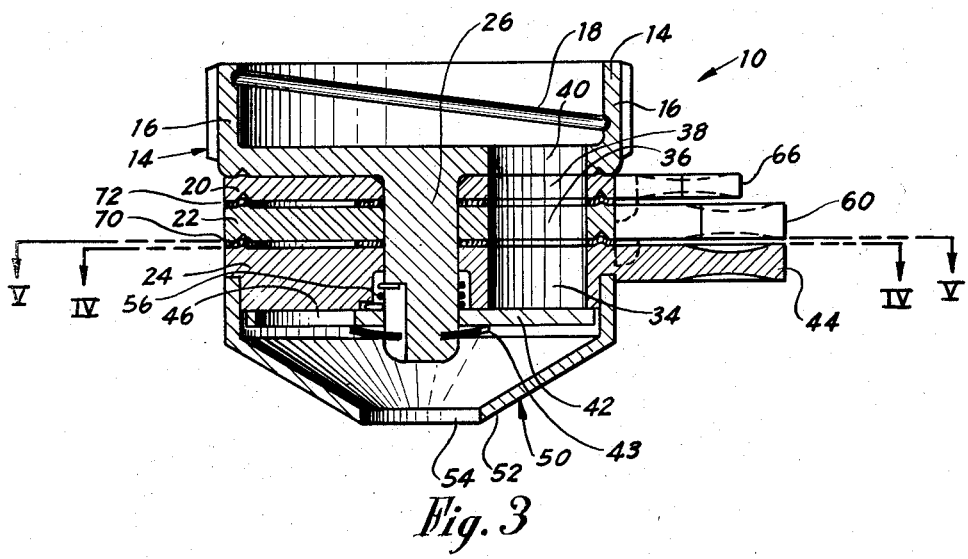
Fig. 3 is a longitudinal cross-sectional view thereof, taken generally along the line III—III of Fig. 2.

With particular reference to Fig. 3, it will be observed that in non-dispensing position each of the metering openings 34 of valve plate 24 is in communicating registry with similar metering openings 36, 38 provided in valve plates 22 and 20, respectively. Further, it is noted that all these metering openings 34, 36, and 38 are also in communication with the container 12 by being in registry with openings 40 provided in frame member 14.

In this non-dispensing position, dispensing is blocked by a blocking means such as an end plate 42 shown non-rotatably carried at the outer end of spindle 26. Axial retainer means such as a wave washer 43 holds the valve plates on the spindle in an axially loaded, stacked arrangement.

Figure 2:
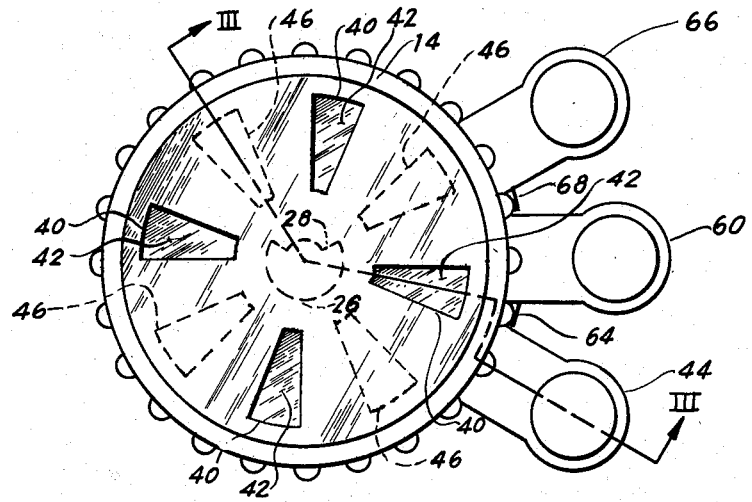
Fig. 2 is a plan view of such a device.

In dispensing the minimum ("level teaspoon") batch, valve plate 24 is manipulated (leftwardly in Fig. 1 and in a clockwise direction as viewed in Figs. 2 and 4) by a manipulating handle 44 to bring each metering opening 34 into dispensing registry with a similarly arranged discharge opening 46 provided in end plate 42.

Movement of valve plate 24 into dispensing registry with discharge opening 46 concurrently moves that metering opening 34 out of communication with metering opening 36 of the adjacent relatively inner valve plate 22, hence out of communication with the container 12.

Accordingly, it is seen that a "level teaspoon" batch will drop from metering opening 34 of valve plate 24 through discharge opening 46 of end plate 42.

A cap means 50, which is shown with walls 52 tapering to a centrally disposed discharge outlet 54, depends from valve plate 24 to channel and guide the dispensed material for discharge.

Spring means such as torsion spring 56 is shown to bias valve plate 24 into a return or non-dispensing position, its ends being shown as respectively received in recesses provided in the spindle 26 and valve plate 24.

In operation of dispensing the minimum ("level teaspoon") batch, it is thus seen that the outermost valve plate 24 is moved relatively to the frame spindle 26, independently of the other valve plates 20, 22. This movement is effected by manipulating handle 44 of plate 24.

A "slightly-rounded spoon" batch is dispensed in the embodiment shown by manipulation of a handle 60 of the adjacent relatively inner valve plate 22. This motion is transmitted to outermost valve plate 24 for accordant movement therewith by means such as the abutment lug or boss 64 shown extending from handle 60 into rotational abutment engagement with handle 44.

Accordingly, "slightly-rounded spoon" batch dispensing is effected by manipulating the handle 60 to move metering openings 36, 34 of valve plates 22, 24, respectively, into communicating registry with discharge outlet opening 46 of the end plate 42. For returning the valve plates 22, 24, spring 56 acts on valve plate 24 and through lug 64 on handle 60 of plate 22.

The volume of the openings 36 of valve plate 22 is the difference between a "slightly-rounded spoon" and a "level teaspoon;" hence in manipulation of handle 60 the sum of volumes of metering openings 36 and 34 dispenses the desired "slightly-rounded spoon" batch.

For effecting "full-rounded spoon" batch delivery, the metering openings 38 of the relatively inward valve plate 20 are of a volume corresponding to the difference between a "full-rounded spoon" and "slightly-rounded spoon" batch.

This valve plate 20 is shown as movable by a handle 66; and means, such as abutment lug 68 similar to lug 64 above described, is shown provided to cause valve plate 22 and hence valve plate 24 to move in accord with plate 20. Thus is effected dispensing of the "full-rounded spoon" batch by the sum of volumes of apertures or metering openings 38, 36, 34.

Spring 56 acts on valve plates 24 and 22 as above stated, and acts through lug 68 on handle 66 and valve plate 20, thus returning all three valve plates to non-dispensing position.

Figure 5:
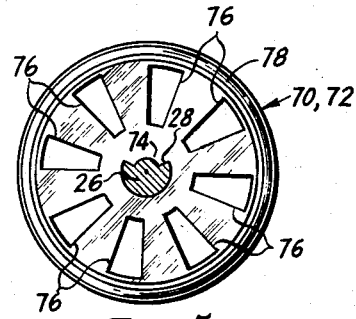

Means such as disks 70 and 72 (Figs. 3 and 5) are shown provided between plates 24—22 and 22—20, respectively, to serve as a sealing means and a sliding means between the plate surfaces. These disks 70, 72, which may be identical, are shown as having a tab 74 (Fig. 5) interfitting in spindle groove 28 to prevent relative rotation of the disks and spindle 26.

Openings 76 are provided in disks 70, 72 to permit dispensing thereacross. As will be evident by a comparison of Fig. 5 with Fig. 4, the arrangement and number of openings 76 of the disks 70, 72 is such as to permit dispensing thereacross in both dispensing and non-dispensing positions of the valve plates.

Further sealing means is provided by the circumferentially extending interfitting means such as the bead means 78 provided on the disks 70, 72 and the bead means 80 provided on the valve plates.

It will thus be seen from the foregoing description of my invention according to this illustrative embodiment, considered with the accompanying drawings, that the present invention provides a new and improved dispensing device having desired advantages and characteristics and accomplishing its intended objects, including those hereinbefore pointed out and others which are inherent in the invention.

It will be understood that modifications and variations may be effected without departing from the scope of the novel concepts of the present invention.

I claim as my invention:

1. Dispensing means comprising a frame member, three valve plates carried by said frame member for rotation relative thereto, said plates comprising an outer, an intermediate, and an inner valve plate, each of said valve plates provided with a metering opening, means providing a discharge outlet from said dispensing means, said valve plates having a non-dispensing position in which the metering openings of all are in communicating registry with each other but sealed from communication with said discharge outlet, said valve plates movable into a dispensing position in which the metering openings of all are in communicating registry with said discharge outlet, means for moving the outer valve plate into dispensing position independently of the intermediate and the inner valve plate, means for moving the outer and intermediate valve plates into dispensing position independently of the inner valve plate, and means for moving all three valve plates into dispensing position.

2. Dispensing means for dispensing metered batches of material from an associated reservoir, comprising a frame member, three valve plates carried by said frame member for translatory movement relative thereto, said plates comprising an outer, an intermediate, and an inner valve plate, each of said plates provided with a metering opening, means providing a discharge outlet from said dispensing means, means for moving the outermost valve plate relatively to said frame member for communication of the valve plate metering opening with the discharge outlet means to permit dispensing through the discharge outlet of an amount metered by its metering opening, means for moving two of the valve plates in accord relatively to said frame member for communication of the two valve plate metering openings with the discharge outlet means to permit dispensing through said discharge outlet of an amount metered by the metering openings of both said two valve plates, and means for moving all three valve plates in accord relatively to said frame member for communication of the three valve plate metering openings with the discharge outlet means to permit dispensing through said discharge outlet of an amount metered by the metering openings of all three said valve plates, means for communicating the metering openings with the associated reservoir, and means for blocking that communication when said openings are in dispensing position and sealing against flow of material from the reservoir to the metering openings.

3. A dispensing means, comprising a plurality of valve plate members extending in a stacked series arrangement from an associated container, said valve plate members being movable between a non-dispensing position and a dispensing position, said valve plate members provided with metering openings in communicating registry with one another and in communication with the associated container when the valve plate members are in non-dispensing position, end plate means sealing against material movement from the outer of said valve plate members when it is in non-dispensing position, said end plate means being provided with a discharge opening spaced from registry with the metering opening of said outer valve plate member when said plate member is in non-dispensing position, first moving means for moving said outer valve plate member independently of relatively inner valve plate members into a dispensing position in discharge communication with said end plate means discharge opening to permit dispensing of material from said outer valve plate member metering opening through said end plate means discharge opening, and second moving means for moving a relatively inner valve plate member and said outer valve plate member into dispensing position in which the metering openings of said relatively inner valve plate member and said outer valve plate member are in discharge communication with said end plate means discharge opening to permit dispensing of material from both of said valve plate metering openings through said end plate means discharge opening.

4. A dispensing means for dispensing metered batches of material from an associated reservoir, comprising a plurality of discharge assistants each having a metering opening adapted to accommodate a batch of material to be dispensed, first moving means for moving one of said discharge assistants independently to bring its metering opening into a dispensing position to dispense its batch of dispense material, and second moving means for jointly moving said one discharge assistant and another of said discharge assistants into overlying dispensing position in which the material of said other discharge assistant is dispensed through the metering opening of the first discharge assistant, thereby to dispense both their batches of dispense material, the metering openings when in dispensing position being out of communication with associated reservoir and sealing against flow of material from the reservoir to the metering openings.

5. A dispensing means comprising a frame adapted to be secured to an associated container, relatively inner valve means having a metering opening adapted for communication with said associated container, an intermediate valve means having a metering opening in registry with the metering opening of said inner valve means, a relatively outer valve means having a metering opening in registry with the metering opening of said intermediate valve means, said inner, intermediate, and outer valve means being operatively relatively movably supported by said frame to permit dispensing selectively from the metering opening of said outer valve means, from the metering openings of said outer and intermediate valve means, and from the metering openings of said outer, intermediate, and inner valve means, and means for selectively translating the said valve means relatively to the frame and to each other to effect each of the selected above-described dispensing operations and for blocking communication with the associated reservoir by sealing against flow from said reservoir to said valve means.

6. Dispensing means provided with a discharge outlet for dispensing from an associated container, a plurality of valve means interposed between the container and said discharge outlet and supported for translatory movement, each of said valve means provided with a metering opening, each relatively outer valve means when in non-dispensing position having its metering opening in communication with the associated container through the metering opening of the adjacent relatively inner valve means, means for relatively translating the outer valve means to a position of discharge registry with said discharge outlet and for sealing against communication with the adjacent relatively inner valve means, and means for relatively translating the outer valve means and its adjacent relatively inner valve means to a position of discharge registry with said discharge outlet and for sealing against communication with the container.

7. Dispensing means comprising a frame member adapted to be secured to an associated container, outlet means providing an outlet means from said dispensing means, said frame member having a valve-carrying member extending outwardly from said associated container, a first valve plate rotatably supported along said valve-carrying member and provided with an aperture, means supported by said frame member for sealing against communication of the aperture of said valve plate with said outlet means when said valve plate is in a non-dispensing position but permitting dispensing communication therebetween when said valve plate has been moved to a dispensing position, moving means for moving said valve plate between non-dispensing and dispensing position, a relatively inner valve plate rotatably supported along said valve carrying member relatively inwardly of said first valve plate and provided with an aperture, and means moving both said first valve plate and said relatively inner valve plate into a dispensing position in dispensing communication with said outlet means.

8. Dispensing means for dispensing from an associated reservoir, comprising an outlet and a plurality of apertured valve plates, said valve plates being arranged in a stacked series extending toward the outlet of said dispensing means, first moving means for relatively translating the outer of said valve plates to a dispensing position in which its aperture is in dispensing communication with said outlet but out of communication with said associated reservoir, second translating means for relatively moving the outer of said valve plates and the adjacent relatively inner valve plate into a dispensing position in which their apertures are in dispensing registry with one another and in dispensing communication with said outlet but out of communication with said associated reservoir, resilient means co-operating with said first moving means for urging both said outer valve plate and said adjacent relatively inner valve plate away from dispensing position out of dispensing communication with said outlet, means sealing against communication of the reservoir and the valve plate apertures when in dispensing position, and means sealing against communication of the valve plate apertures and the dispensing outlet when in non-dispensing position.

9. A dispensing means, comprising a plurality of valve plate members extending in a stacked series arrangement from an associated container, said valve plate members being movable between a non-dispensing position and a dispensing position, said valve plate members provided with metering openings in communicating registry with one another and in communication with the associated container when the valve plate members are in non-dispensing position, end plate means sealing against material movement from the outer of said valve plate members when it is in non-dispensing position, said end plate means being provided with a discharge opening spaced from registry with the metering opening of said outer valve plate member when said plate member is in non-dispensing position, first moving means for moving said outer valve plate member independently of relatively inner valve plate members into a dispensing position in discharge communication with said end plate means discharge opening to permit dispensing of material from said outer valve plate member metering opening through said end plate means discharge opening, and second moving means for moving a relatively inner valve plate member and said outer valve plate member into dispensing position in which the metering openings of said relatively inner valve plate member and said outer valve plate member are in discharge communication with said end plate means discharge opening to permit dispensing of material from both of said valve plate metering openings through said end plate means discharge opening, each valve plate metering opening being formed of a plurality of spaced apertures, and the end plate means discharge opening being formed likewise of a plurality of spaced apertures, to provide that a quantity of material corresponding to the total volume of each of the valve plate metering openings may be dispensed with correspondingly less relative movement of the respective valve plate than if the total volume of material to be dispensed by the valve plate were defined by a single metering aperture.

References Cited in the file of this patent

UNITED STATES PATENTS

| | | |
|---|---|---|
| 1,752,720 | Bergelson | Apr. 1, 1930 |
| 2,002,039 | McPhee | May 21, 1935 |
| 2,386,128 | Ludwig | Oct. 2, 1945 |
| 2,571,596 | Meredith et al. | Oct. 16, 1951 |
| 2,729,366 | Chadwick | Jan. 3, 1956 |